(12) United States Patent
Zimmer et al.

(10) Patent No.: US 7,732,968 B2
(45) Date of Patent: Jun. 8, 2010

(54) WINDING BODY FOR A COIL OF AN ELECTRICAL MACHINE

(75) Inventors: Manfred Zimmer, Zeil (DE); Ralf Rönnebeck, Schonungen (DE); Alexander Gehring, Hassfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 459 days.

(21) Appl. No.: 11/801,906

(22) Filed: May 11, 2007

(65) Prior Publication Data
US 2007/0279178 A1 Dec. 6, 2007

(30) Foreign Application Priority Data
May 11, 2006 (DE) .................. 10 2006 021 903

(51) Int. Cl.
*H02K 1/00* (2006.01)
(52) U.S. Cl. .................................. 310/194; 310/179
(58) Field of Classification Search ................ 310/194, 310/179, 71, 261.01, 260, 216.01
See application file for complete search history.

(56) References Cited

U.S. PATENT DOCUMENTS

| | | | | |
|---|---|---|---|---|
| 4,583,696 A * | 4/1986 | Mosher | .................. | 310/208 |
| 4,603,274 A * | 7/1986 | Mosher | .................. | 310/270 |
| 6,127,760 A * | 10/2000 | Nagasaki et al. | ...... | 310/216.074 |
| 6,509,665 B1 * | 1/2003 | Nishiyama et al. | .......... | 310/215 |
| 6,541,888 B2 | 4/2003 | van Heyden et al. | | |
| 7,026,739 B2 * | 4/2006 | Okada et al. | ................. | 310/194 |
| 7,053,515 B2 * | 5/2006 | Nakanishi et al. | ........... | 310/194 |
| 7,291,955 B2 * | 11/2007 | Otsuji | .......................... | 310/194 |
| 7,511,394 B2 * | 3/2009 | Okada et al. | ................... | 310/71 |
| 7,545,063 B2 * | 6/2009 | Yoshida et al. | ................. | 310/71 |

* cited by examiner

*Primary Examiner*—Thanh Lam
(74) *Attorney, Agent, or Firm*—Cohen Pontani Lieberman & Pavane LLP

(57) ABSTRACT

A winding body for holding a winding of an electrical conductor to produce a coil for an electrical machine includes a winding area formed by a winding support and two sidepieces connected to the winding support. The sidepieces form the boundaries of the winding area and are connected to the winding support. Various measures are proposed for mounting a compact winding on the winding body, for arranging the winding body without play and in an operationally reliable manner on a tooth of an electrical machine, and for wiring several coils together in a space-saving manner by using the winding body.

15 Claims, 5 Drawing Sheets

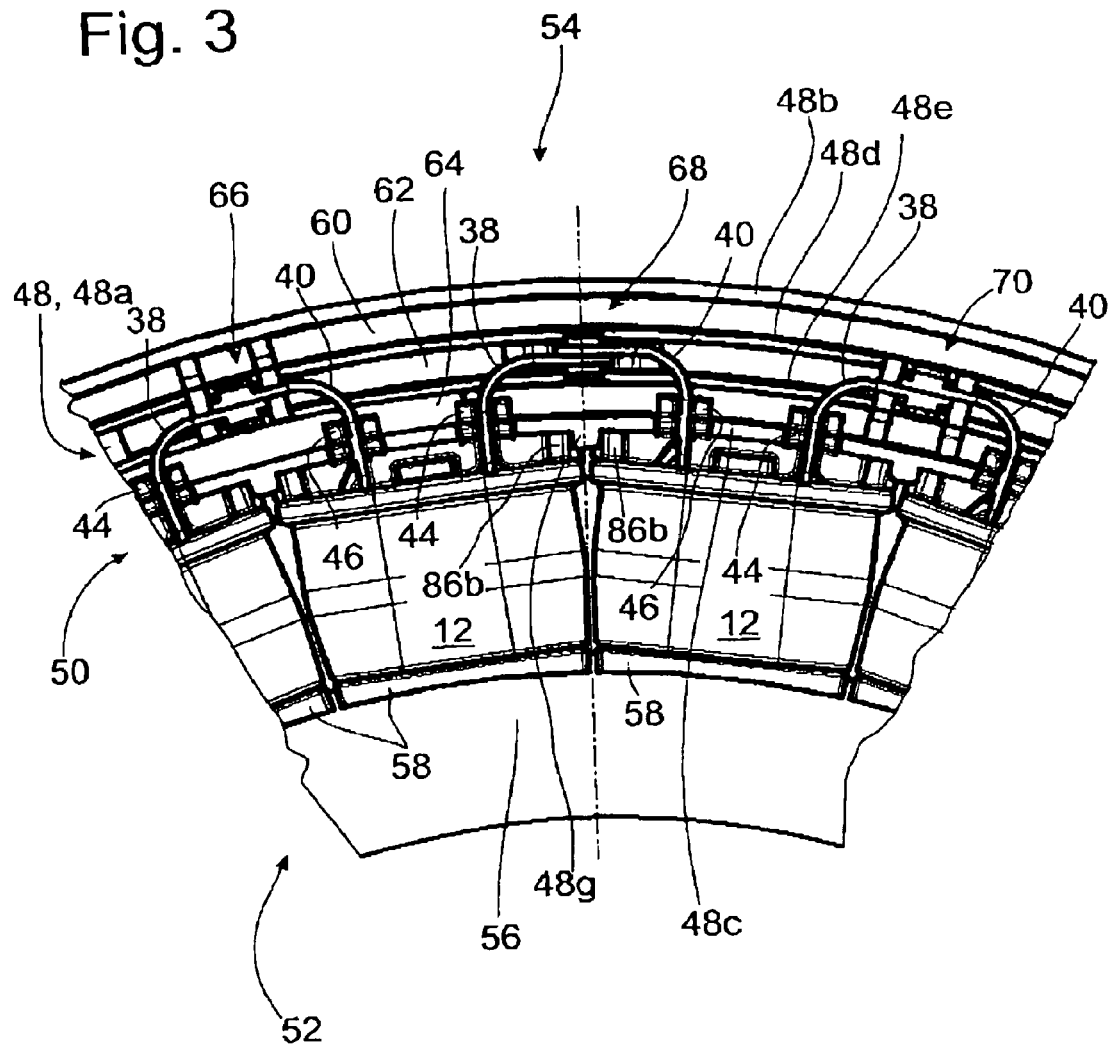

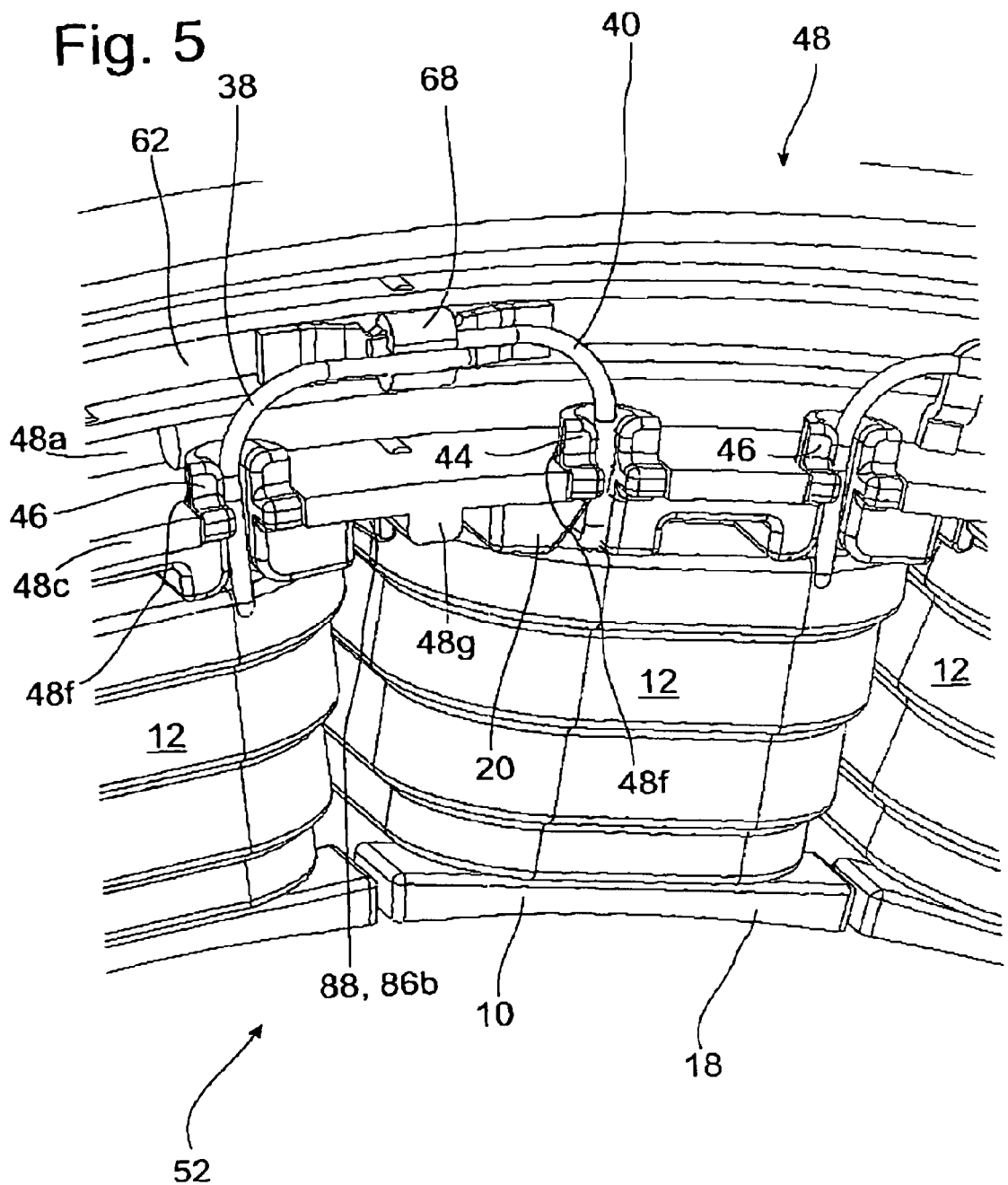

WINDING BODY FOR A COIL OF AN ELECTRICAL MACHINE

BACKGROUND OF THE INVENTION

1. Field of the Invention

The present invention relates to a winding body for holding a winding of an electrical conductor to produce a coil for an electrical machine, the winding body having a winding area formed by a winding support and two sidepieces which form the boundaries of the winding area, the sidepieces being connected to the winding support.

2. Description of the Related Art

U.S. Pat. No. 6,541,888 discloses a coil body which is used with a second coil body to produce a coil designed to be mounted on a tooth of a rotor or stator yoke of an electrical machine. In their totality, the individual coils on the stator form a concentrated winding of an electrical machine. Each coil has an individual conductor strand. The leading and trailing ends of adjacent ones of the coils are connected electrically to each other by linking the conductors of the coils.

SUMMARY OF THE INVENTION

An object of the present invention is to solve several problems associated with the prior art. In particular, according to a first aspect of the present invention, a winding body is provided on which the individual conductor windings of a coil rest tightly against each other without slipping and thus produce a compact and tightly wound coil. According to another aspect of the present invention, a winding body is provided on which the ends of the coil are laid in a space-saving manner without interfering with the build-up of the winding, the latter aspect being especially important for the beginning part of the winding. According to yet another aspect of the present invention, a winding body is provided which can be arranged in a space-saving manner on a coil wiring arrangement in which the ends of several coils are electrically connected to each other in a predetermined manner. According to yet another aspect of the present invention, a winding body is provided which can be attached reliably and free of play in all three directions of space to a tooth of an electrical machine. Finally, a winding body is provided which offers an improved receiving space or slot for an insulating layer or a piece of insulation paper.

The object of the present invention is met by an embodiment of a winding body for holding a winding of an electrical conductor to produce a coil for an electrical machine with a winding area formed by a winding support and two sidepieces which form the boundaries of the winding area, the sidepieces being connected to the winding support, wherein the winding support has profiling or contour shaped to guide the placement and winding direction of the electrical conductor on the winding support.

According to one embodiment, a groove open to the winding area is arranged in at least one of the side pieces to hold one of the ends of the wound coil.

In a further embodiment, at least one feed-in section is defined in one of the side pieces that is configured to cooperate with a support structure of a coil wiring arrangement and is at least partially accommodated in the support structure.

According to another embodiment, the winding body includes retaining means for assembly with a support structure of a coil wiring arrangement.

In yet another embodiment, the winding body includes compensating means allowing the coil to fit onto teeth of an electrical machine having different lengths and for different lengths of the coil, i.e., because of manufacturing tolerances.

In another embodiment, the winding body has a retaining formation which cooperates with the flanks of a tooth of an electric machine.

According to a further embodiment, at least one of the winding support and the side pieces of the winding body define a recess for holding an insulating layer, wherein at least one side of the recess includes a non-straight edge.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings. wherein like reference characters denote similar elements throughout the several views:

FIG. 3 is an end view of a portion of a stator of an electrical machine equipped with coils in accordance with FIG. 2 where a support structure of a coil wiring device is attached to the coils;

FIG. 5 is a perspective view of the connection between the support structure and the winding body according to FIG. 3.

DETAILED DESCRIPTION OF THE PRESENTLY PREFERRED EMBODIMENTS

Figure 1:
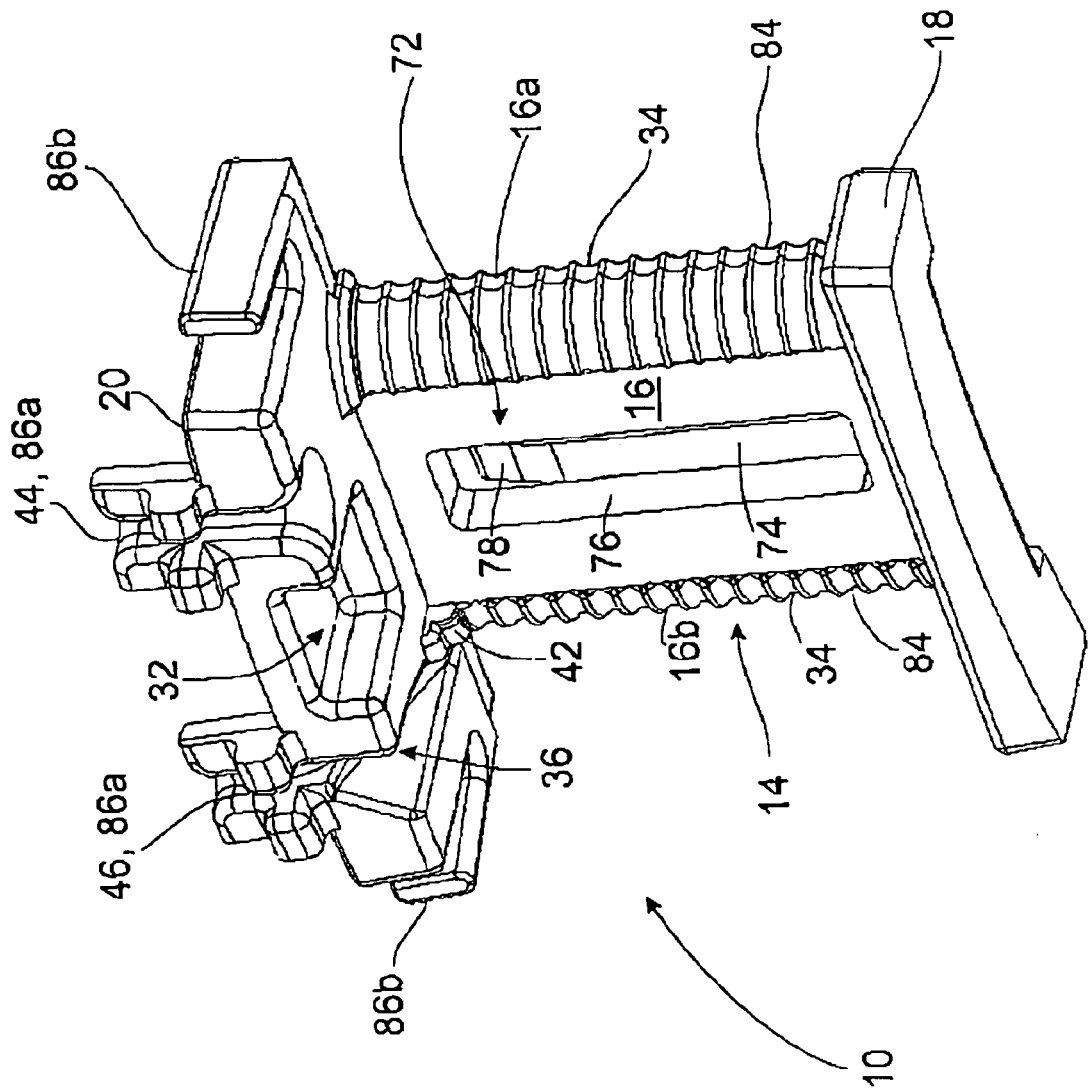
FIG. 1 is a perspective view of a winding body according to an embodiment of the present invention.
Figure 2:
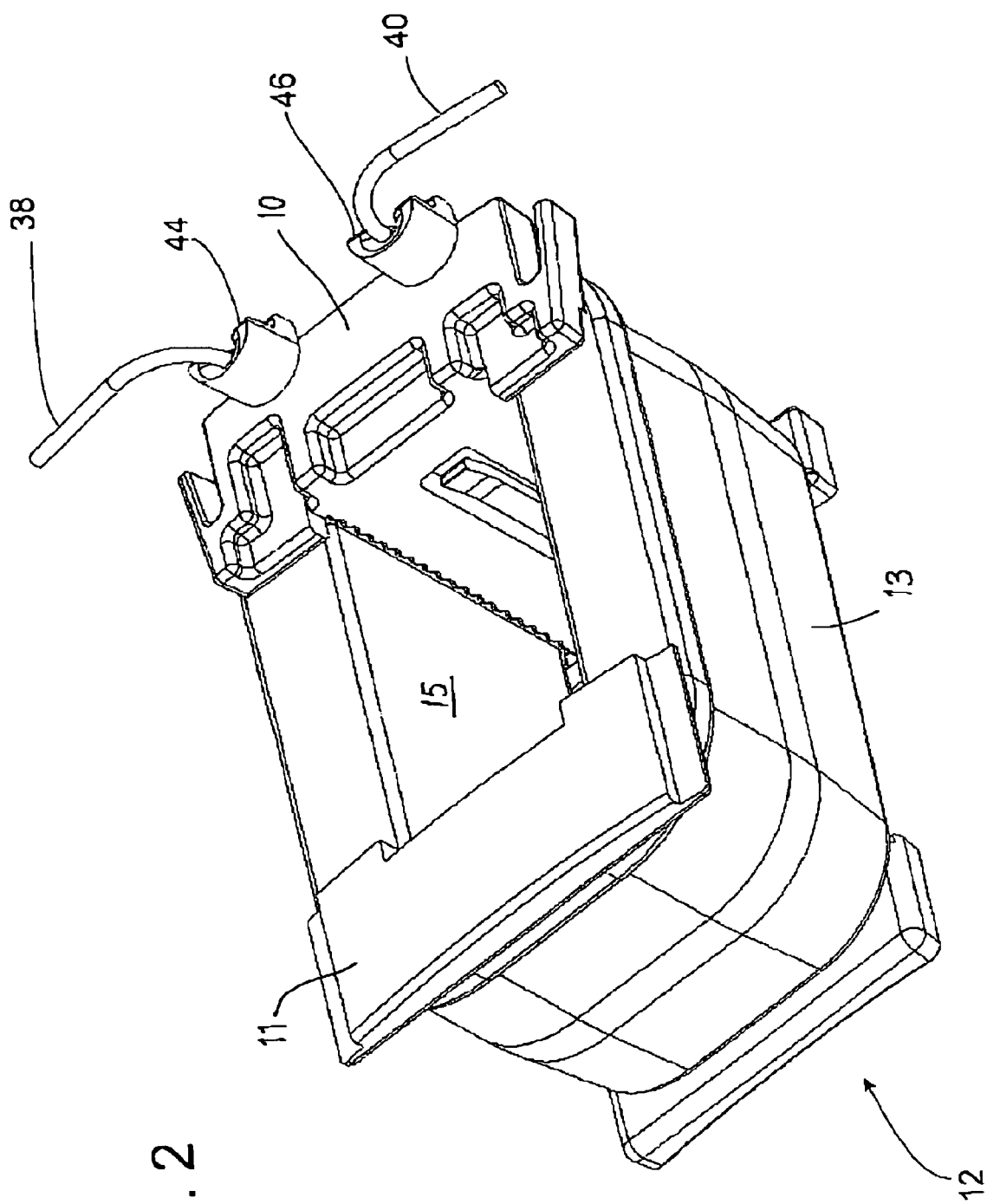
FIG. 2 is a perspective view of a prefabricated coil using the winding body according to FIG. 1.

FIGS. 1-3 show a winding body 10, which cooperates with a second winding body 11 to hold a winding 13 comprising a wound electrical conductor which forms a coil 12 for an electrical machine. The winding body 10 comprises in its basic structure a winding area 14, which is formed by a winding support 16, and two sidepieces 18, 20. The sidepieces 18, 20 form the boundaries of the winding area 14 and are connected to the winding support 16. The length of the sidepieces 18, 20 is approximately equal to the width of the head of the winding 13 wound on the body 10.

FIG. 2 shows a prefabricated coil 12, which, in this form, is ready to be mounted on a tooth of the stator of an electrical machine. The coil is pushed radially onto the tooth, secured in position, and electrically connected as illustrated in FIG. 3.

Figure 4B:
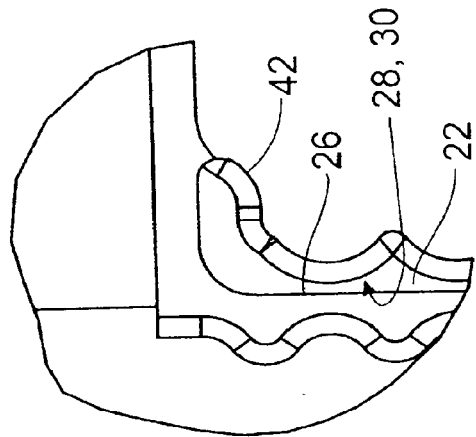
FIG. 4B is a close up of a feature of the rear view of FIG. 4A.
Figure 4A:
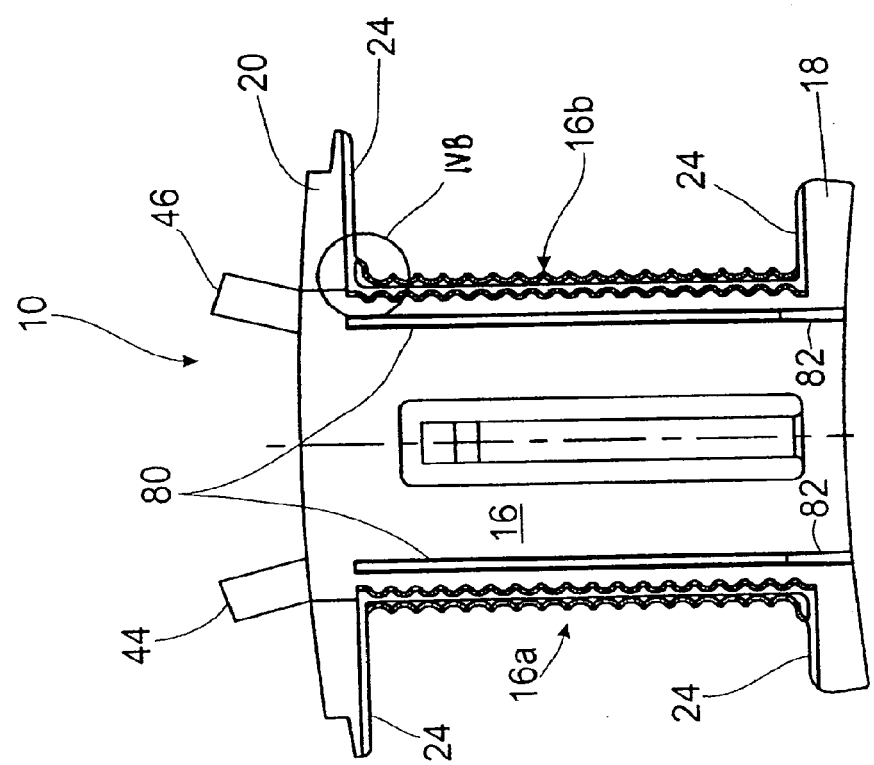
FIG. 4A is a rear view of surface of a winding body.

When the coil 12 is produced, it is also necessary for it to be surrounded by a suitable insulating layer, such as by a piece of slot insulation paper 15 (see FIG. 2). This paper must be laid in the winding bodies 10 at beginning of the winding process and be held in place there by the bodies during winding. For this purpose, the winding support 16 and/or at least one of the sidepieces 18, 20 in FIG. 4 is provided with a recess 22, 24. In the present exemplary embodiment, recesses 22 are formed on the side facing away from the winding area 14 as a groove in the edge areas or corners 16a, 16b of the winding support 16. Further recesses 24 are formed as step-like shoulders on the sidepieces 18, 20. The height of the shoulders of recesses 24 is selected so that the height of the shoulders is approximately the same as the thickness of the insulating layer. As a result of the step-like formation of the recesses 24, the first goal of the present invention is achieved in that the insulating layer held in place by the winding bodies 10 and is prevented from slipping during the winding process. The groove of recess 22 provided in the winding support 16 has a straight edge on one side wall 26 and a non-straight contour, such as a wave-like contour, on the other, opposite side, as a result of which the slot insulating paper is clamped in place and can be secured even more effectively against slipping out of position. In addition, the insulating layer does not project beyond the sidepieces 18, 20 or the winding support 16 during the winding process and thus cannot become skewed.

Referring back to FIG. 1, sidepiece 20 defines a recess 32 open to the winding area 14. A temperature sensor (not shown) may be inserted in the recess 32 to detect the temperature of the coil 12.

FIG. 1 also shows that the winding support 16 has a profiling 34 in the form of closely adjacent grooves or scores 34 in the edge areas 16a, 16b for guiding the winding direction of electrical conductor forming the winding. The scores 34 are spaced apart by the effective diameter of the conductor along the length of the winding support 16. If round wire is being used to make the coil 12, the scores 34 will be spaced apart by a distance equal to the diameter of the wire. In the upper sidepiece 20 of the winding body 10 in FIG. 1, a groove 36, which is open to the winding area 14 and proceeds from the edge 16b of the winding support 16 to the free end of the sidepiece 20, is provided to accept an end 38, 40 of the conductor of the coil 12. The depth of the groove 36 increases as it proceeds toward the free end of the sidepiece 20, as a result of which it is ensured that the leading end 40 of the conductor, i.e., the first inserted end 40 of the conductor of the winding 13, cannot hinder the winding of the conductor on the winding body 10 and the buildup of the winding 13, as a result of which the coil 12 can be filled with copper to a high degree Over most of the length of the groove 36, its depth corresponds to the cross section of the electrical conductor effectively present in the depth direction.

An elevated shoulder 42 is formed at the transition between the winding support 16 and the sidepiece 20. In this position, the first turn of the conductor adjacent to the sidepiece 20 is lifted somewhat away from the sidepiece 20, because the groove 36 does not have the necessary depth here to accommodate the conductor completely.

On the free end of the sidepiece 20, there are two feed-in sections 44, 46 to accept the ends 38, 40 of the conductor. The feed-in section 46 shown on the left in the FIG. 1 merges with the groove 36 and is intended to hold the leading end 40 of the conductor, whereas the feed-in section 44 shown on the right in FIG. 1 is intended to hold the trailing end 38 of the conductor. The two feed-in sections 44, 46 are designed to project more or less at right angles from the sidepiece 20, as a result of which they fit into a support structure 48 of a coil wiring arrangement 50 and can thus be connected permanently to the stator 52 of an electrical machine 54.

FIG. 3 shows part of a stator 52 of an electrical external-rotor machine 54 with a stator yoke 56 and radially outward-pointing teeth 58, on which several coils 12 have already been arranged with the use of the winding bodies 10, 11 described here. The coil ends 38, 40 of the conductors of the coils 12 are wired in a predetermined manner to three linking conductors 60, 62, 64 by terminal elements 66, 68, 70.

A latching device 72 is provided on the winding support 16 so that the winding body 10 can be mounted on a stator tooth 58 of the electrical machine. The latching device 72 has a locking tab 74, which is attached at one end to the winding support 16, and thus holds the coil 12 in position, especially in the radial direction, on the stator 52 The locking tab 74 is free to pivot in an opening 76 provided in the winding support 16 and carries at its other end a locking projection 78, which engages in a corresponding recess (not shown) in a stator tooth 58, where it is then locked in place.

Compensating means 80 are provided on the side of the winding support 16 facing the stator tooth 58, so that the coil 12 is held in place without play, especially in the axial direction of the stator 52. These compensating means compensate for differences in length of teeth 58 of an electrical machine and the length of the coil 12 being held by that tooth, i.e., due to manufacturing tolerances. The compensating means 80 are in the form of deformable webs (FIG. 4). These webs 80 have a feed bevel 82, and, when the coil 12 is pushed onto a tooth 58, the webs are plastically deformed as a function of the fit present here, so that the coil 12 is mounted firmly on the stator tooth 58 even under the influence of vibrations caused during operation.

Two retaining webs 84 or retaining edges are provided at the edge areas 16a, 16b of the winding support 16 to form a retaining formation for the lateral support of a coil 12, i.e., for support in the circumferential direction, on the stator 52. These webs 84 or edges project beyond the rear contact surface of the winding support 16 and at least partially grip the flanks of a stator tooth 58, that is, by a narrow edge extending in the axial direction toward the stator 52. For this purpose, it is sufficient to design the edges 16a, 16b, for example, so that they project slightly.

The linking conductors 60, 62, 64 belonging to the wiring arrangement 50 are designed as round conductors and are laid in a plastic support structure 48 which has a U-shaped cross-section and is thus open on one side. The groove in the support structure 48 is defined by a base 48a and walls 48b, 48c. The conductors 60, 62, 64 are insulated from each other in the groove by separating webs 48d, 48e. To produce a compact wiring arrangement 50 the support structure 48 is brought up as close as possible to the coils 12 and the winding bodies 10, so that the feed-in sections 44, 46 fit into the recesses 48f provided for this purpose in the support structure 48 and so that the winding body 10 and support structure 48 fit into each other to a certain extent.

To attach the support structure 48 to the coils 12 and to hold it in position there, retaining means 86a, 86b are provided on the winding bodies 10. First retaining means 86a are already provided by the radially outward-extending feed-in sections 44, 46 of the winding bodies 10 on the stator 52. These feed-in sections 44, 46 fit into the recesses 48f and provide an axial stop on the stator 52 in one direction and simultaneously secure the bodies 10 and the support structure in their circumferential positions with respect to each other (see FIG. 5).

The winding body 10 also has two second retaining means 86b, one on each side of the sidepiece 20. These second retaining means 86b are designed as and hereafter referred to as spring tongues 86b. So that the support structure 48 can be secured in position, adjacent spring tongues 86b of two winding bodies 10 permanently mounted on the stator 52 work together and in common form a one-way latching formation 88. Radially inward-projecting radial projections 48g on the support structure 48 work together with the two spring tongues 86b of the one-way latching formation 88. After the coils 12 are mounted on the stator 52, the support structure 48 is pushed in the axial direction onto the radially outer area of the stator 52, e.g., onto the outer circumferential surface formed by the coils 12, until the recesses 48f of the support structure 48 come to rest against the feed-in sections 44, 46 forming the first axial stop. Also during the pushing of the support structure, the radial projections 48g slide between two of the spring tongues 86b, which are spread apart by the radial projection 48g. After the projections 48g have passed all the way through, the spring tongues 86b snap back into their original positions again and thus prevent the connection from inadvertently becoming loose. Thus the ends of the spring tongues 86b form a second axial stop after the installation of the support structure 48. This arrangement offers the additional advantages that the linking conductors 60, 64, 66 and the ends 38, 40 of the coil can be embedded jointly in an insulating compound and thus made water-tight and that the occurrence of vibration-caused breaks in the wires is reliably avoided because the coil ends 38, 40 are guided from their exit point at the winding area 14 all the way to the connection point with the terminal elements 66, 68, 70 which are connected with the linking conductors 60, 62, 64.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A winding body for receiving a winding comprising a wound electrical conductor to produce a single coil for an electrical machine, with a winding area for the winding formed by a winding support and two side pieces connected to the winding support, wherein the winding support and side pieces define the winding area between the two side pieces, wherein at least one of the side pieces defines a groove open to the winding area and configured to hold one of the ends of the electrical conductor of the winding, wherein the winding body is individually separable from and mountable on a stator of the electrical machine.

2. The winding body of claim 1, wherein the at least one of the side pieces has a first end configured to face a center of the winding and a free end configured to face an outer side of the winding, and a depth of the groove increases proceeding toward the free end of the at least one of the sidepieces.

3. The winding body of claim 1, wherein a depth of the groove is configured to correspond to a cross section of the conductor of the coil at least over part of the length of the groove.

4. The winding body of claim 1, further comprising an elevated shoulder arranged at a transition area between the winding support and the at least one of the sidepieces.

5. The winding body of claim 1, wherein the winding support has profiling to guide the winding direction of the electrical conductor in the winding area on the winding support.

6. The winding body of claim 1, wherein the two side pieces laterally extend from the winding support.

7. A winding body for receiving a winding comprising a wound electrical conductor to produce a single coil for an electrical machine, with a winding area for the winding formed by a winding support and two side pieces connected to the winding support, wherein the winding support and side pieces define the winding area between the two side pieces, at least one of the side pieces has a feed-in section projecting from the at least one of the side piece away from the winding area and configured to accept one of the ends of the conductor of the winding, and the feed-in section is configured to cooperate with a support structure of a coil wiring arrangement and to be at least partially accommodated in the support structure, and wherein the winding body is individually separable from and mountable on a stator of the electrical machine.

8. The winding body of claim 7, wherein the winding body has a first retaining means comprising a stop formed by the feed-in section.

9. The winding body of claim 7, further comprising second retaining means formed on the winding body, the second retaining means being configured so that adjacent ones of the second retaining means of two stationary winding bodies create a one-way latching formation.

10. The winding body of claim 7, wherein the support structure of the coil wiring arrangement is separable from the winding body.

11. A winding body for receiving a winding comprising a wound electrical conductor to produce a single coil for an electrical machine, with a winding area for the winding formed by a winding support and two side pieces connected to the winding support, wherein the winding support and side pieces define the winding area between the two side pieces, and wherein the winding body has retaining means configured for assembly with a support structure of a coil wiring arrangement, wherein the winding body is individually separable from and mountable on a stator of the electrical machine.

12. The winding body of claim 11, wherein the retaining means are configured so that adjacent ones of the retaining means of two stationary winding bodies create a one-way latching formation.

13. The winding body of claim 11, wherein the support structure of the coil wiring arrangement is separable from the winding body.

14. A winding body for receiving a winding comprising a wound electrical conductor to produce a single coil for an electrical machine, with a winding area for the winding formed by a winding support and two side pieces connected to the winding support, wherein the winding support and side pieces define the winding area between the two side pieces, and compensating means configured to compensate for differences between a length of a tooth of an electrical machine on which the coil is mountable and a length of the coil held by this tooth, the compensating means arranged on a side of the winding support facing away from the winding area, wherein the winding body is individually separable from and mountable on a stator of the electrical machine.

15. The winding body of claim 14, wherein the compensating means comprise at least one deformable web.

* * * * *